(12) United States Patent
Griffioen et al.

(10) Patent No.: US 6,517,053 B1
(45) Date of Patent: Feb. 11, 2003

(54) METHOD FOR INSTALLING CABLES IN DUCTS USING A PRESSURIZED FLUID AND A DEVICE FOR CARRYING OUT SAID METHOD

(75) Inventors: Willem Griffioen, The Hague (NL); Harm Geert Nobach, The Hague (NL)

(73) Assignee: Koninklijke KPN N.V. (NL)

( * ) Notice: Subject to any disclaimer, the term of this patent is extended or adjusted under 35 U.S.C. 154(b) by 0 days.

(21) Appl. No.: 09/763,020

(22) PCT Filed: Sep. 27, 1999

(86) PCT No.: PCT/EP99/07402

§ 371 (c)(1), (2), (4) Date: Feb. 15, 2001

(87) PCT Pub. No.: WO00/22470

PCT Pub. Date: Apr. 20, 2000

(30) Foreign Application Priority Data

Oct. 8, 1998 (NL) .............................................. 1010270

(51) Int. Cl.⁷ .................................................. B60F 3/24
(52) U.S. Cl. ............................... 254/134.4; 254/134.3 R
(58) Field of Search ....................... 254/134.4, 134.3 R; 222/3, 226, 389, 395–396, 394

(56) References Cited

U.S. PATENT DOCUMENTS

| 5,301,851 A | * | 4/1994 | Frutin ............................ 222/3 |
| 6,112,528 A | * | 9/2000 | Rigby ............................ 222/3 |
| 6,116,578 A | * | 9/2000 | Pruett ....................... 254/134.4 |
| 6,311,953 B1 | * | 11/2001 | Lang et al. ............... 254/134.4 |
| 6,328,283 B1 | * | 12/2001 | Reeve et al. ............. 254/134.4 |

FOREIGN PATENT DOCUMENTS

| EP | 0 108 590 | 5/1984 |
| GB | 2 122 367 | 1/1984 |

* cited by examiner

Primary Examiner—Lee Wilson
(74) Attorney, Agent, or Firm—Michaelson & Wallace; Peter L. Michaelson

(57) ABSTRACT

Method and device for installing cables in ducts using a pressurized fluid, a fluid being applied which, under the operational pressure and operational temperature applied during the installation, is in a liquid state and which, under the ambient pressure and ambient temperature prevailing at the location of the installation, is in gaseous state. By applying such a fluid, the advantages of installing a cable using a liquid flow and using a gas flow may be combined, while the drawbacks respectively associated therewith are obviated.

9 Claims, 3 Drawing Sheets

METHOD FOR INSTALLING CABLES IN DUCTS USING A PRESSURIZED FLUID AND A DEVICE FOR CARRYING OUT SAID METHOD

BACKGROUND OF THE INVENTION

1. Field of the Invention

The invention relates to a method for installing cables in ducts using a fluid.

2. Description of the Prior Art

Such method, in which the fluid is a pressurized gas, is disclosed, e.g., in EP-A-0,108,590. Said method has the advantage of the propelling forces being evenly distributed over the length of the cable, so that installation is also possible in curved sections. In the event of conventional pulling of a cable, all force is concentrated in the initial part of the cable, as a result of which installation in curved sections is a problem.

A method of the above type, in which the fluid is water, is disclosed, e.g., in GB-B-2,122,367. Using fluid in general has the advantage that the friction between the outside cable wall and the inner duct wall is less than in the event of using air, since the cable floats, at least in part, in the fluid. A further advantage is that the capacity of the pump used for introducing the fluid into the duct, in the event of a liquid may be less than in the event of a gas, since a liquid has a higher viscosity than a gas. This is particularly advantageous for larger duct diameters. It may also be an advantage that the pressure drop in the event of using a liquid is linear, and there is therefore exercised a constant entraining force along the duct section. A still further advantage is that, in the event of using a liquid, electrostatic effects, as a result of which the cable is attracted to the duct wall, in most cases are capable of being cancelled out.

Using liquids, such as water, however, also has its drawbacks. In most cases, after installing the cable the water must be removed from the duct. In the event of optical-fibre cables without a metal water screen, there may occur fibre breakage in the presence of water as a result of stress corrosion. In the event of copper cables without water screen, the electrical properties will deteriorate. Finally, freezing of the water may cause damage. Another problem in the event of using water is that, in elevated parts of the duct section, particularly in duct sections featuring relatively steep parts, in a water-filled duct there may still remain enclosed an air bubble, as a result of which there arises additional friction in elevated parts. Having such air bubbles escape is possible, though expensive, which is also true for applying a vacuum to the duct in advance.

SUMMARY OF THE INVENTION

An object of the invention is to provide for a method in which the drawbacks of installing cables using a liquid are lacking or are suppressed to a great extent, while the advantages are being maintained.

For this purpose, the invention provides for a method of the above type, characterized in that a fluid is used which, under the operational pressure and operational temperature used during installation, is in a liquid state and which, at the ambient pressure and ambient temperature prevailing at the installation location, is in gaseous state.

The invention is based on the insight that, if use is made of a fluid which at the operational circumstances prevailing at the installation of cables in ducts by, e.g., varying the pressure and/or temperature, is brought to a liquid state and that at the ambient pressure and ambient temperature prevailing at the location of installation is in a gaseous state, the advantages of installing using a gaseous medium and installing with a liquid medium, may be advantageously combined. After all, a liquid is very suitable for installing, but hard to remove, while a gas has drawbacks in the event of installation but is simple to remove. Generally, for this purpose use may be made of a fluid which is in a liquid state at a preferably significantly lower pressure than the maximum permissible operational pressure, or due to a temperature reduction, but which upon reducing the pressure or increasing the temperature, is in a gaseous state once again.

The method according to the invention is particularly suitable to use in situations in which the installation duct bridges a difference in altitude, as in mountainous regions and in high-rise construction.

With the method according to the invention, it is possible to use a fluid, which is subject to such a pressure difference that it exercises an entraining force on the cable to be installed. It is also possible, however, to utilize the fluid exclusively to have the cable float and to further install the cable using a combination of pushing and pulling. In this case, the fluid either flows with a velocity lower than the propulsion speed of the cable, or the fluid may even flow in a direction opposite to the propulsion direction of the cable.

Examples of fluids for which the liquid state is attained substantially using a pressure increase are, e.g., HFKs (hydrofluorocarbons), ammonia, propane, butane, fluids which nowadays are used as cooling liquids and are, to a certain extent, environmentally safe. LPG (liquefied petroleum gas), too—a mixture of propane and butane—may be used as a fluid. Another example are the CFCs [=chlorofluorocarbons) which, however, are less desirable in view of the damage incurred by the environment.

As an example of a fluid with which the liquid state is attained substantially by using temperature reduction, $CO_2$ may be referred to. The advantage of $CO_2$ is that it is neither flammable nor aggressive. In the event of using $CO_2$, the pressure should preferably remain in excess of 5 bar (triple point) in order to prevent the formation of solid matter, which would impede the installation. At a normal operational pressure, the temperature should be significantly lower than the ambient temperature, e.g., −60° C., in order to maintain the $CO_2$ in the liquid state. At such a low temperature, the friction between cable and duct wall will decline. The density of $CO_2$ is 1.1 g/cm$^3$, somewhat higher than that of water, and makes it possible to exercise a great floating effect on a cable.

Table 1 offers an overview of examples of applicable fluids and their physical properties.

A second option, which is based on the concept on which the invention is founded, is, particularly in the event that the applicable fluid is recycled, to first have the duct in which the cable is to be installed blown through with the gaseous state of the fluid which later, at the installation proper of the cable, will be used in the liquid state. During the subsequent further filling of the duct with a fluid which is now, as a result of higher pressure and/or lower temperature, in the liquid state, the gas in the duct will also condensate to form a liquid. Due to said condensation of the gas in the duct, the problem referred to above of the inclusion of air bubbles is also obviated.

In addition, the invention comprises a device for carrying out the method according to the invention, provided with means to couple a fluid flow to the input end of the duct in order to fill the duct with the fluid, and with means to introduce the cable into the input end of the duct, characterized in that there are provided means to pressurize the fluid and/or reduce its temperature in order to bring the fluid to the liquid state, the means comprising a stock vessel and/or a compressor and/or cooling means, which compressor and/or cooling means are coupled to the input end of the duct.

BRIEF DESCRIPTION OF THE DRAWINGS

Below, the invention will be explained in greater detail on the basis of exemplary embodiments with reference to the drawing. In it.

Figure 1:
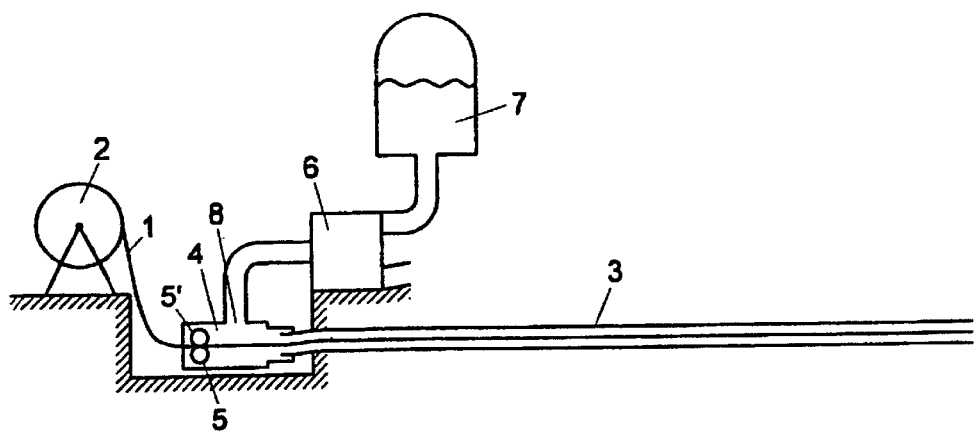
FIG. 1 shows a first arrangement for carrying out the method according to the invention.

In the figures, equal parts are denoted by equal reference numerals.

DETAILED DESCRIPTION

FIG. 1 shows a first arrangement. A cable 1 is wound on a reel 2 and must be introduced into a duct 3 using an input device 4. Said input device may be of the type disclosed in EP-A-0,292,037 and during the installation, if so desired, -the propulsion force of the cable may be supplemented by forces exercised using pressure rollers 5, 5' accommodated in the input device 4. The fluid is pumped from a stock vessel 7 using a compressor or a compressor/cooler 6 as a liquid by way of an inlet aperture 8 of the input device 4 into the duct 3. The end of the duct 3 may be open. If use is made of a flammable fluid, it is undesirable that it flow freely from the open end of the duct 3. It is quite possible, however, to burn off the fluid at that location.

Another option is to recycle the fluid. For this purpose, the fluid may be collected in a vessel at the end of the duct. In doing so, it is desirable to also place a compressor which pumps the fluid into the vessel at the end of the duct. As a result, the fluid pressure at the end of the duct may be low, which benefits the entraining forces exercised in the duct.

Figure 2:
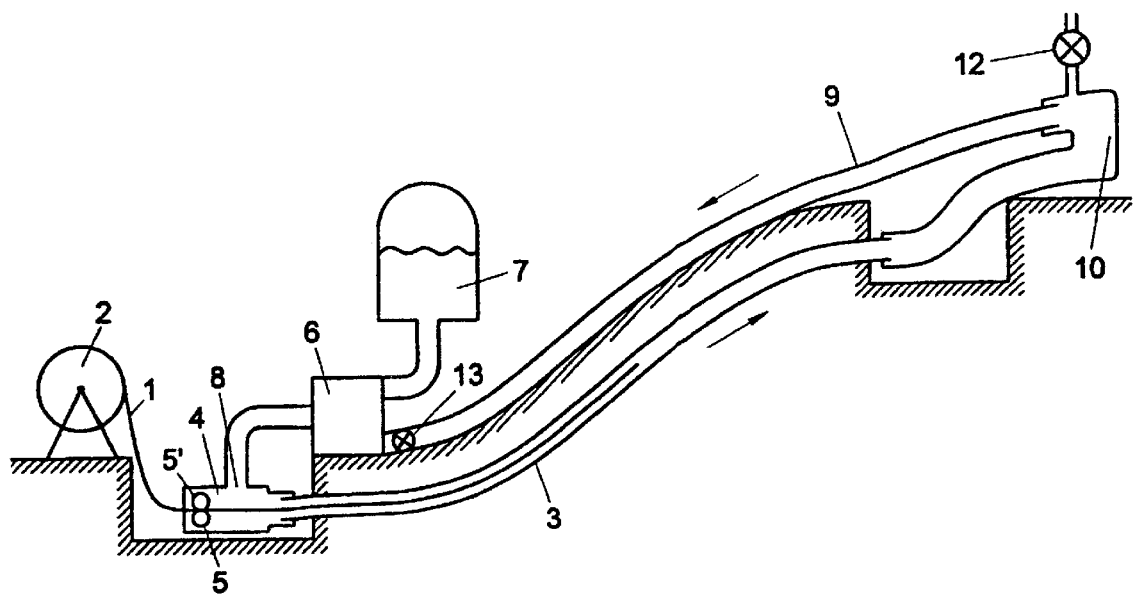
FIG. 2 shows a second arrangement for carrying out the method according to the invention.

For the benefit of recycling, the fluid, as FIG. 2 shows, may also be returned, by way of a return pipe 9, to the input end of the duct, a so-called forced circulation. As a return pipe, there may be used any other pipe already available under the ground, or above the ground there may be provisionally laid a second pipe, e.g., a hose. The fluid is returned, by way of a feedback piece 10 and the return pipe 9, to the compressor 6. In the arrangement shown, there is also shown a difference in height between the input end and the output end of the duct 3. This gives rise, if the fluid in the return flow is a liquid, to the advantage that the weight of the return-fluid column "presses" on the input side of the compressor 6, as a result of which it only must supply the circulation pressure and not the hydrostatic pressure. This may be of importance if, e.g., ducts are installed in a substantially vertical direction in high-rise construction.

If the return pipe has too high a flow resistance, a compressor at the end of duct 3 may also offer a solution. It is simpler to use a return pipe having a sufficiently large diameter, as a result of which the pressure drop over said pipe remains limited. The return pipe may possibly be a duct enveloping the installation ducts. If it is undesirable for the return flow to have too low a temperature, e.g., when using carbon dioxide, there may be placed a heat exchanger at the transition from the installation duct to the return pipe, in order to heat up the return flow.

During the circulation, the fluid in the return pipe may be circulated in the form of gas or liquid. If the return flow is gaseous, the diameter of the return pipe 9 must be considerably larger than the one of the duct 3, since the gas must flow much more rapidly than the liquid. Upon circulation of liquid only, the compressor 6 must circulate only liquid and there occur no temperature effects due to the liquid expanding.

Ducts having a smaller diameter are easily filled over their entire length upon pumping-in a liquid. For ducts having a larger diameter, in which liquid columns "break" easily, the following solution may be chosen. First, the duct 3 is allowed to fill using the compressor 6, the compressor supplying a pressure of, e.g., 10 bar. This is amply sufficient for a height difference of 50 m, since, when using, e.g., liquid butane, each 10 m of rise, demands approximately 0.6 bar of pressure. Filling may be simplified by venting or burning off, there being opened air-relief cock 12 at the highest point and the feedback duct 9 being closed using a cock 13 on the compressor 6. There may also be several air-relief cocks if there are several local highest points. Once the liquid in the feedback piece 10 overflows the rim, feedback duct 9 will fill with liquid. Once the feedback piece 10 and the feedback duct 9 are entirely filled with liquid, the air-relief cock 12 may be closed. Reservoir 7 is then closed off and the entry to the feedback duct 9 on compressor 6 is opened. The system now is in the "circulation mode". The entire operational pressure of compressor 5 may now be used to circulate liquid. In order to compensate for the pressure drop over feedback duct 9, there may be placed, as mentioned earlier, a second compressor at feedback piece 10. Said circulation mode may also be attained by first having the pipes 3 and 9 blown through with the fluid in gaseous state.

Figure 3:
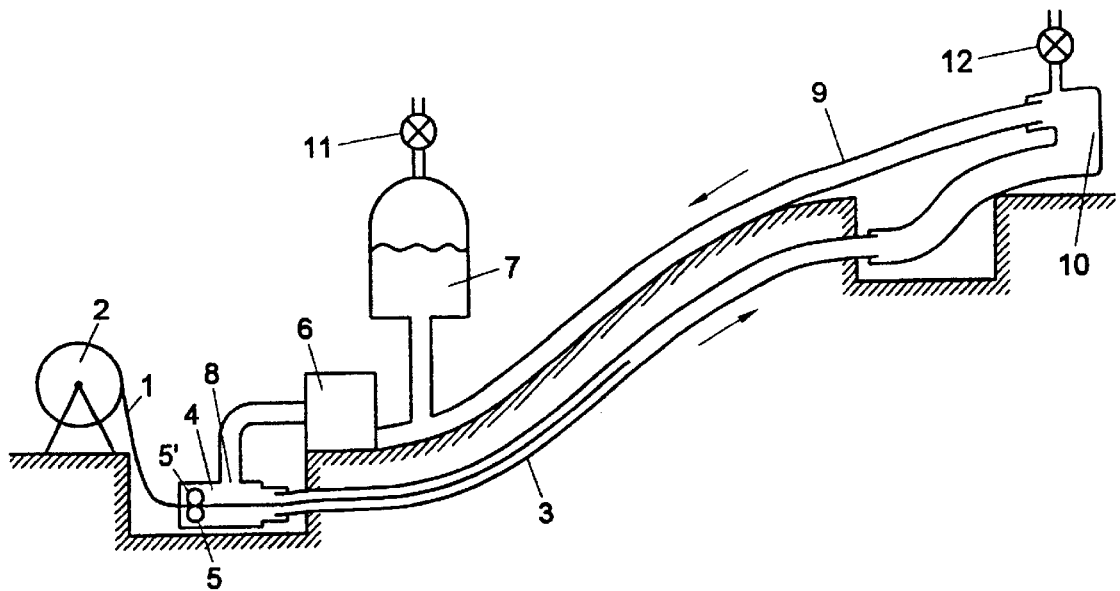
FIG. 3 shows a third arrangement for carrying out the method according to the invention.

As FIG. 3 shows, it is also possible to couple resevoir 7 directly to the bottom end of the feedback duct 9. In this case, however, the reservoir is pressurized and must be capable of withstanding this. This may be solved as follows:

pressurized gas may be added by way of a cock 11. Said gas must be a gas different from butane, since butane condenses at a pressure in excess of 2 bar, preferably a gas, such as nitrogen, which is incapable of forming an explosive mixture with the gas already present, which gas then operates as a propellant. At the location of the gas/liquid transition in the reservoir, there may also be placed a piston (not shown). Reservoir 7 now has the function of an overflow tank, such as with a central-heating installation.

Figure 4:
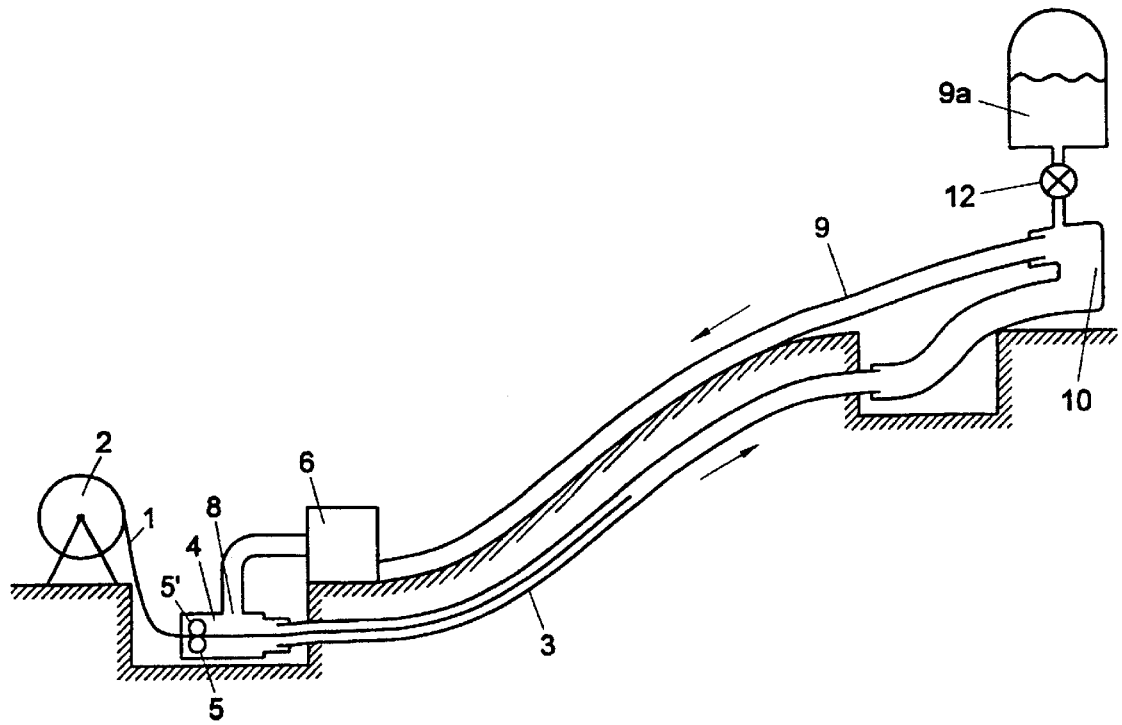
FIG. 4 shows a fourth arrangement for carrying out the method according to the invention.

With larger differences in altitude than those which may be bridged by compressor 6, it is possible, as shown by FIG. 4, to fill from the air-relief cock 12. Now it is possible, in vessel 9a, for the gaseous state and the liquid state of the butane to exist side by side. If the highest point is incapable of being attained, it is still possible, with butane, to attain 16 meters more of difference in altitude than may basically be attained by the pump, namely, by placing a vacuum pump at the end of duct 3 near coupling piece 10.

In the feedback piece 10, there is space to let the cable 1 through after it has passed the end of duct 3. After installation, the end of the cable is then well accessible for further processing. From this situation, after uncoupling the feedback piece 10, the cable 1 is capable of being still further installed by connecting a second input device 4 to a next duct.

Figure 5:
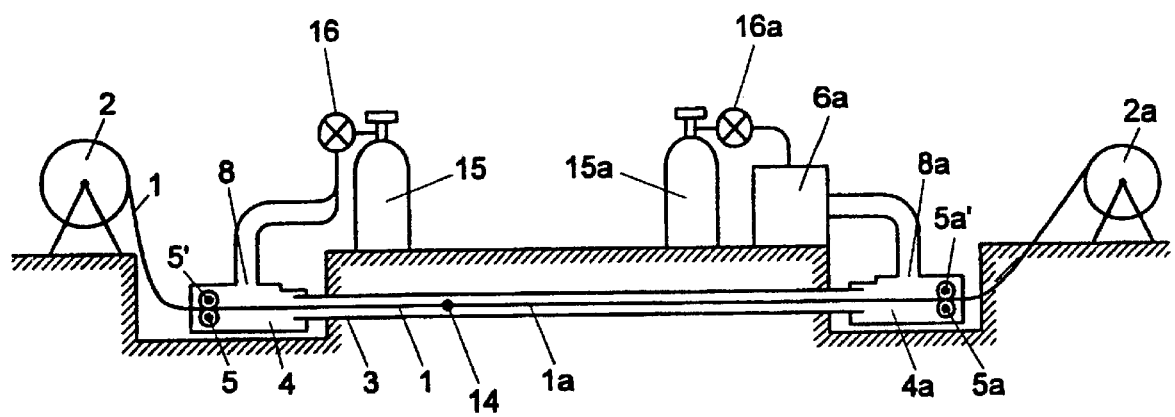
FIG. 5 shows a fifth arrangement for carrying out the method according to the invention.

In the exemplary embodiment according to FIG. 5, cable 1 is connected, by way of a coupling 14, to a towing wire 1a.

In the arrangement shown, at the output of the duct 3 there is provided for an output device 4a having a pair of pressure rollers 5a, 5a' and an exhaust opening 8a for fluid. Essentially, the setup of device 4a is the same as that of device 4. To the input device 4, there is fed liquid carbon dioxide, by way of a cock 16, from a cylinder 15. Since the gas in the cylinder is already pressurized, no compressor is required. By heating the cylinder 15, the pressure therein is capable of being maintained. By opening the cock 16 a little, there is first admitted carbon dioxide in gaseous form. By way of duct 3, this flows to the output device 4a, where it may be collected in a cylinder 15a, possibly by way of a compressor 6a. Subsequently, using a cock 16a in the supply pipe to cylinder 15a, the pressure at the output of duct 3 is set at a value in excess of 5 bar. Subsequently, cock 16 is opened wider, until the desired operational pressure at the input end is attained. Once the duct is filled with liquid, or possibly before that, it is permitted to start the introduction of cable 1, pushing it using wheels 5, 5' of the input device 4 and pulling the towing wire 1a with the wheels 5a and 5a' of the output device 4a. The liquid carbon dioxide runs into cylinder 15a, while the pressure at the end of duct 3 is maintained in excess of 5 bar using cock 16a. In doing so, use may possibly be made of a compressor 6a. It is also permitted to cool cylinder 15a.

The invention will be explained below by reference to five examples. In the first three examples, butane is used as a fluid, while in the fourth and fifth examples, the fluid is $Co_2$.

EXAMPLE 1

This example deals with the blowing of standard optical fibre into empty "loose-duct" cables. A cable consists of a number of ducts "twisted" into a cable, each duct having an inner diameter of 1 mm and an outer diameter of 1.5 mm. The cables may be produced as normal optical-fibre cables, omitting the optical fibre and any filler present. Various of said "standard" cables may be connected one to another in a (branched) network. The optical fibres may then be introduced without welding. In the exemplary calculation, there is assumed a duct length of 500 m and a pressure difference of 12 bar.

In such a ductlet, there is introduced an optical fibre having a standard coating. It has a weight of W=0.00072 N/m (see Appendix 2) and a density $\rho_{fibre}$=1.5 g/cm$^3$. The effective weight $W_f$ in liquid butane therefore is 0.00043 N/m. The friction coefficient f between optical fibre and ductlet is 0.2. The pressure with respect to the atmospheric pressure amounts to 12 bar.

From formulas (1), (2) and (3) of Appendix 1, there follows a flow rate v=0.32 m/s and a volume flow of $\phi_v$=2.4×10$^{-4}$ l/s (Note; In the calculation, it was assumed that the pressure at the output with respect to the atmospheric pressure is 2 bar. This is necessary to maintain the butane in the liquid state.). From formula (1) in Appendix 1, it follows that the Reynolds number is 1000, and therefore laminar. For the entraining force, it follows from formula (5) of Appendix 1 that: $dF_{b1}/dx$=2×10$^{-4}$ N/m. This is amply greater than the friction coefficient $fW_f$=0.9×10$^{-4}$ N/m. The maximum feasible installation length is therefore over 1100 m, while, for comparison's sake, 420 m may be attained by blowing in. The fibre will approximately flow as fast as the butane. The installation of 500 m takes as little as half an hour. There are required approximately 0.4 liters of liquid for flowing through, plus the same amount again for filling the ductlet. This is a "worst-case" situation, however: for the major part, filling occurs during the installation; in addition, the initial flow rate and the entraining force will be greater since the ductlet has not yet been filled with liquid over its entire length.

In order to be capable of conducting the fibre, and particularly its end, through the continuous curve made by an encabled (twisted) ductlet, the bending radius must be amply in excess of 20 cm; this is easily achieved.

EXAMPLE 2

A fibre bundle having a diameter $D_c$=2.5 mm, comprising 6 glass fibres, is installed in a duct having an outer diameter of 8 mm and an inner diameter of 6 mm, and a length of 5 km. The weight W=0.03 N/m, the density $\rho_{fibre}$=0.63 g/cm$^3$ (lighter than water), therefore the effective weight $W_f$ in butane is 0.0015 N/m. The friction coefficient f between fibre bundle and duct amounts to 0.25. The pressure difference over the duct amounts to 10 bar.

Assuming a turbulent flow, there follows a flow rate v=0.3 m/s and a volume flow $\phi_v$=7×10$^{-3}$ l/s (again see Appendix 1, formulas (1), (2) and (3), once again subtracting 2 bar). The Reynolds number is 5400; the flow is therefore really turbulent. For the entraining force there follows, using formula (4) of Appendix 1: $dF_{b1}/dx$=1.9×10$^{-3}$ N/m. This is significantly higher than the friction force $fW_f$ of 0.4×10$^{-3}$ N/m. The theoretically highest attainable installation length, therefore, even exceeds 20 km! The fibre bundle will approximately flow as fast as the butane. The installation of the 5 km will take almost 5 hours. There are required approximately 140 liters of liquid for flowing through, plus the same quantity again for filling the duct. This relates to the "worst-case" situation.

EXAMPLE 3

This example concerns the installation of a standard optical-fibre cable in a duct having an outer diameter of 32 mm and an inner diameter of 26 mm and having a length of 1200 m at a pressure difference of 8 bar, the butane being returned to the input of the duct.

From actual practice, it is known that large quantities of water are hard to remove from a duct having such a large diameter. Particularly with underwater passages and other situations where the duct lies deeper in the soil, water remains behind.

The optical-fibre cable has a weight W=1 N/m, a rigidity B=1 Nm$^2$, a diameter $D_c$=10 mm and a density $\rho_{cable}$=1.3 g/cm$^3$. For the effective weight $W_f$ in butane, there then applies $W_f$=0.54 N/m. For the friction coefficient f between optical-fibre cable and duct, there applies f=0.2.

Assuming that the flow is turbulent, there follow a flow rate v=1.9 m/s and a volume flow 100$_v$=0.9 l/s (see Appendix 1, this time without 2 bar being subtracted from the pressure, since recycling is involved). The Reynolds number is 148200, the flow therefore is indeed turbulent. For the entraining force, there follows 0.14 N/m. This is greater than the friction force $fW_f$=0.11 N/m, but the speed of installation will be lower, approximately 1 m/s. The installation then takes about 20 minutes and there is more than 1000 l of liquid butane required. Recycling is therefore desirable indeed. For comparison's sake: upon blowing in using air, in the same situation a length of 700 m is feasible.

EXAMPLE 4

This example concerns the installation of a cable in a duct having an outer diameter of 8 or 10 mm and an inner diameter of 6 or 8 mm, respectively. $CO_2$ is conducted into the duct, the pressure at the beginning being 12 bar and, at the end of the duct, 5 bar (triple point).

The used cable has a weight W=0.22 N/m, a rigidity B=0.1 Nm$^2$, a diameter $D_c$=5 mm and a density $\rho_{cable}$=1.14 g/cm$^3$. The effective weight of the cable in carbon dioxide $W_f$=0.008 N/m. To the friction coefficient between cable and duct, there applies f=0.2. The pushing force $F_{push}$=100 N.

For the calculations, there was assumed a duct section having in it oscillations with an amplitude A=5 cm and a period P=6 m, after each 200 m a 90° curve and a bending radius $R_b$=1 m. In the event of calculations using software based on the theory described in this application, for the installation using air there follows an installation length of approximately 600 m for both ducts, which signifies that the entraining forces of the flowing air play but a subordinate rôle. For installing with running carbon dioxide, however, there follows an installation length of 2 km and 4 km for the 8/6 mm and the 10/8 mm duct, respectively. In this case, therefore, the entraining forces of the flow do play a major rôle. Since the weight of the cable is well adjusted to the density of the liquid, there are almost no forces left to stop the cable. As a result, the small forces experienced in curves by the cable as a result of the rigidity thereof play an unmistakable rôle as well. For a smaller bending radius of the curves, $R_b$=0.5 m, the installation length therefore is reduced to 800 m and 1800 m for the 8/6 mm and the 10/8 mm duct, respectively. The effect of the cable rigidity in the curves may be diminished by additionally pulling the cable head. The installation length then is 1700 m and 3300 m at a bending radius $R_b$=0.5 m, and 3400 m and 5100 m for a bending radius $R_b$=1 m, both for the 8/6 mm and the 10/8 mm duct, respectively.

In the event of an 8/6 mm duct having a length of 2 km, the flow rate v≈0.4 m/s and the volume flow $\phi_v$≈0.011 l/s. The Reynolds number is 13200, or amply turbulent. The installation of the cable takes a little over 83 minutes and there is a little more than 9 l of liquid carbon dioxide required.

EXAMPLE 5

In this example, use is made of a combination of pulling and pushing, as shown in FIG. 5. In this example all parameters, with the exception of the pressure at the input of the duct, are the same as in Example 4. In this example, the entraining forces of the liquid are not used at all. The liquid is there only for (partly) letting the cable float. A liquid, such as carbon dioxide, admittedly must be kept flowing in order to keep the temperature sufficiently low, but if the cable is pulled with a velocity in the order of the flow rate of the liquid or over, or even in a direction opposite to the flow direction of the liquid, there are no longer involved entraining forces exercised by the liquid on the cable. From calculations there follows, in this case, with a pushing and pulling force of 100 N, an installation length of 1250 m and 1050 m with curves having a bending radius $R_b$ of 1 m and 0.5 m, respectively. Said result is substantially equal for the 8/6 mm and the 10/8 mm duct.

Appendix 1: Flow Through Duct

For the calculations below, use was made of the formulas offered in the book "Installation of optical cables in ducts", by W. Griffioen, Plumettaz, Bex (CH) 1993.

The flow through a duct is characterized by the Reynolds number Re:

$$Re = \frac{\rho v D_h}{\mu} \quad (1)$$

where v is the average speed, ρ is the density (1.3 kg/m³ for air, 1000 kg/m³ for water and 600 kg/m³ for liquid butane) and μ is the dynamic viscosity (1.8×10⁻⁵ Pas for air, 110× 10⁻⁵ Pas for water and 20×10⁻⁵ Pas for liquid methane) of the flowing medium and $D_h$ the hydraulic diameter. The latter is equal to the inner diameter $D_d$ of the duct and, for duct filled with cable having a diameter $D_c$, equal to $D_d$–$D_c$. For a Reynolds number smaller than 2000, the flow is laminar, otherwise it is turbulent. There occurs hysteresis, however: if the turbulent state is achieved from the laminar state, the speed at the same pressure over the duct will be reduced. The pressure will initially have to be reduced a great deal further before a laminar flow is again obtained. In the event of a pressure gradient dp/dx over the duct, the average speed v follows from:

$$\frac{dp}{dx} = -C_d \frac{\rho v^2}{2D_h} \quad (2)$$

The drag coefficient $C_d$ follows from Re:

$$C_d = \frac{64}{Re} \text{ dus } \frac{dp}{dx} = -\frac{32 \mu v}{D_h^2} \text{ for laminar flow and}$$

$$C_d = \frac{0.31}{Re^{1/4}} \text{ dus } \frac{dp}{dx} = -\frac{0.155 \mu^{1/4} \rho^{3/4} v^{7/4}}{D_h^{5/4}} \text{ for turbulent flow.}$$

The volume flow $\phi_v$ to be calculated with $$\phi_v = v\pi D_d^2/4 \quad (3)$$

for a duct without cable and $\phi_v = v\pi(D_d^2-D_c^2)/4$ for a duct filled with cable. The pressure gradient in the duct is linear for liquid flows and non-linear for (compressible) gas flows:

$$\frac{dp}{dx} = \frac{(1 - p_a^2/p_i^2)p_i}{2l\sqrt{1 - (1 - p_a^2/p_i^2)x/l}} \text{ for gas flow.}$$

The pressure gradient in the duct results in a force $F_{b1}$ on the cable present therein, which may be broken down into two components, the hydrostatic $F_{hs}$ and the hydrodynamic $F_{hd}$. For turbulent flow, there follows:

$$\frac{dF_{hs}}{dx} = \frac{\pi}{4}D_c^2\frac{dp}{dx} \text{ en } \frac{dF_{hd}}{dx} = \frac{\pi}{4}D_c(D_d - D_c)\frac{dp}{dx}$$

and therefore in total:

$$\frac{dF_{bt}}{dx} = \frac{\pi}{4}D_cD_d\frac{dp}{dx} \quad (4)$$

As to the hydrodynamic component it was assumed, for turbulent flow, that the speed is constant over the entire duct cross section (except for the laminar boundary layer) and the forces are evenly distributed over the surfaces of the duct and the cable. With laminar flow, such is not the case; here, the speed is largest in the middle and is reduced towards the walls (of cable and duct). The liquid will therefore exert less effect on the part of the cable near the duct wall. In a worst-case assumption, which is approximated for cables which are small as compared to the duct, only the projection of the cable on the duct wall is included as an effective surface of the cable. As a result, the entraining force is reduced by a factor π. Summarizing, for laminar flow there follows:

$$\frac{dF_{bt}}{dx} = \frac{\pi}{4}\left[D_c^2 + \frac{1}{\pi}D_c(D_d - D_c)\right]\frac{dp}{dx} \quad (5)$$

Appendix 2: Standard Coated Optical Fibre

The glass in a glass fibre consists of quartz glass (density ρ of 2.4 g/cm³ and Young's modulus E of 72 Gpa) having a diameter of 125 μm. Surrounding it is a first layer of (soft) coating of U.V. acrylate (density ρ of 1.3 g/cm³ and Young's modulus E of 0.005 Gpa) up to a diameter of 187.5 μm. Around this again there is a final outer layer of (hard) coating of U.V. acrylate (density ρ of 1.3 g/cm³ and Young's modulus E of 0.5 Gpa) up to a diameter of 250 μm.

In total, therefore, the glass fibre has a density ρ of 1.5 g/cm³, as was found from direct weight measurements as well.

TABLE 1

Density $\rho_{liq}$, vapour pressure $P_{sat}$, boiling point $T_b$, and viscosity $\eta$ at various pressures for various liquids.

| running medium | $\rho_{liq}$ (kg/m³) | $P_{sat}$ at 20° C. (bar) | $T_b/\eta$ (1 bar) (° C./×10⁻³ Pas) | $T_b/\eta$ (5 bar) (° C./×10⁻³ Pas) | $T_b/\eta$ (10 bar) (° C./×10⁻³ Pas) | $T_b/\eta$ (15 bar) (° C./×10⁻³ Pas) |
|---|---|---|---|---|---|---|
| water | 1000 | | 100/1 | | | |
| ethane | 546[1] | 40 | −88.6 | 53 | −32 | |
| propane | 501[2] | 8 | −42.1/0.19 | 1.4/0.12 | 26.9/0.09 | |
| butane | 579[2] | 2 | −0.5 | 50 | 80 | |
| carbon dioxide | 1100[3] | | −78[4] | −57[5]/0.25 | 40/0.18 | −28/0.15 |
| ammonia | 910 | 9 | −33 | 5 | 26 | |
| freon-12 | | | −30 | | | |

[1] at the boiling point
[2] pressurized
[3] 1560 for the snow
[4] at 1 atmosphere, no liquid but snow (flakes) of carbon dioxide; triple point at 5 bar
[5] from this point onwards, no more snow is formed upon evaporation.

What is claimed is:

1. A method for installing a cable in a pre-installed duct comprising the step of:

propelling a foremost end and following portions of the cable in the duct by means of a fluid flowing through the duct from an input end of the duct to an output end of the duct;

wherein the propelling step is carried out with a fluid which, at ambient conditions with respect to pressure and temperature reigning on site of installation outside the duct, is in a gaseous state, and the propelling step further comprises the step of injecting the fluid into the input end of the duct at operational conditions, with respect to pressure and temperature, under which the fluid is in a liquid state.

2. The method according to claim 1 further comprising the step of returning the fluid at the output end of the duct to the input end of the duct by way of a return pipe.

3. The method according to claim 2 wherein the fluid in the gaseous state thereof is returned by the return pipe.

4. The method according to claim 2 wherein the fluid is returned by the return pipe in the liquid state thereof.

5. The method according to claim 1 further comprising the step of collecting the fluid at the output end of the duct in a reservoir.

6. The method according to claim 1 further comprising the step, performed prior to the propelling step, of causing the fluid to flow through the duct in the gaseous state.

7. The method according to claim 1 further comprising the step, performed in conjunction with the propelling step, of mechanically pushing the cable locally at the input end of the duct.

8. The method according to claim 1 wherein the fluid is chosen from a group consisting of HFKs (hydrofluorocarbons), CFCs (chlorofluorocarbons), ammonia, propane, butane or a mixture thereof.

9. The method according to claim 1 wherein the fluid is $CO_2$.

* * * * *